(12) United States Patent
Thomas et al.

(10) Patent No.: US 11,065,681 B2
(45) Date of Patent: Jul. 20, 2021

(54) BRAKE CARRIER CASTING AND A METHOD OF MAKING A BRAKE CARRIER CASTING

(71) Applicant: Meritor Heavy Vehicle Braking Systems (UK) Limited, Gwent (GB)

(72) Inventors: Paul Thomas, Gwent (GB); Simon Fisher, Gwent (GB); Michael Wright, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 64 days.

(21) Appl. No.: 16/200,179

(22) Filed: Nov. 26, 2018

(65) Prior Publication Data

US 2019/0176229 A1 Jun. 13, 2019

(30) Foreign Application Priority Data

Dec. 13, 2017 (EP) ..................................... 17207077

(51) Int. Cl.
| | |
|---|---|
| *B22D 25/02* | (2006.01) |
| *B22C 9/06* | (2006.01) |
| *B22C 9/02* | (2006.01) |
| *B22C 9/10* | (2006.01) |
| *B22C 9/22* | (2006.01) |

(Continued)

(52) U.S. Cl.
CPC ................ *B22D 25/02* (2013.01); *B22C 9/02* (2013.01); *B22C 9/06* (2013.01); *B22C 9/10* (2013.01); *B22C 9/101* (2013.01); *B22C 9/103* (2013.01); *B22C 9/108* (2013.01); *B22C 9/22* (2013.01); *B22D 25/00* (2013.01); *F16D 65/0056* (2013.01); *F16D 2055/0008* (2013.01); *F16D 2200/0013* (2013.01)

(58) Field of Classification Search
CPC .... B22C 9/02; B22C 9/06; B22C 9/10; B22C 9/22; B22C 9/103; B22D 25/02; F16D 55/02; F16D 55/226; F16D 65/18; F16D 65/56
USPC ..................... 188/73.31, 73.39, 73.46, 73.47
See application file for complete search history.

(56) References Cited

U.S. PATENT DOCUMENTS

| | | | |
|---|---|---|---|
| 7,108,109 B1 * | 9/2006 | Wilkings | ................ B22C 9/046 |
| | | | 188/72.4 |
| 2007/0267256 A1 * | 11/2007 | Blatt | ....................... F16D 55/22 |
| | | | 188/73.31 |

(Continued)

FOREIGN PATENT DOCUMENTS

| | | |
|---|---|---|
| CN | 1491325 A | 4/2004 |
| CN | 201664749 U | 12/2010 |

(Continued)

OTHER PUBLICATIONS

European Patent Office, Extended European Search Report for Application Serial No. EP17207077.3-1103, dated May 9, 2018.

(Continued)

*Primary Examiner* — Christopher P Schwartz
(74) *Attorney, Agent, or Firm* — Brooks Kushman PC

(57) ABSTRACT

A brake carrier casting and a method of making a brake carrier casting. The brake carrier casting may have a first side portion and a second side portion that may be connected by a first bridge and a second bridge. The first side portion, second side portion, first bridge, and second bridge may define an opening of the brake carrier casting.

11 Claims, 7 Drawing Sheets

(51) Int. Cl.
*F16D 65/00* (2006.01)
*B22D 25/00* (2006.01)
*F16D 55/00* (2006.01)

(56) References Cited

U.S. PATENT DOCUMENTS

| | | | |
|---|---|---|---|
| 2009/0078513 A1* | 3/2009 | Redemann | F16D 55/02 |
| | | | 188/73.39 |
| 2011/0290597 A1* | 12/2011 | Miura | F16D 55/2265 |
| | | | 188/72.4 |
| 2012/0291662 A1* | 11/2012 | Gotlund | B22C 9/101 |
| | | | 105/230 |
| 2016/0215835 A1 | 7/2016 | Cleary et al. | |
| 2019/0178318 A1* | 6/2019 | Scherer | F16D 65/0068 |

FOREIGN PATENT DOCUMENTS

| | | |
|---|---|---|
| CN | 105822701 A | 8/2016 |
| CN | 205689644 U | 11/2016 |
| CN | 106369087 A | 2/2017 |
| EP | 2682631 A1 | 1/2014 |
| WO | 2010033694 A1 | 3/2010 |
| WO | 2012139738 A1 | 10/2012 |

OTHER PUBLICATIONS

Chinese Office Action dated Apr. 27, 2020, for related Chinese Application No. 201811462255.4; 7 Pages.
India Examination Report dated Jun. 1, 2020, for related India Application No. 201814043202; 6 Pages.

\* cited by examiner

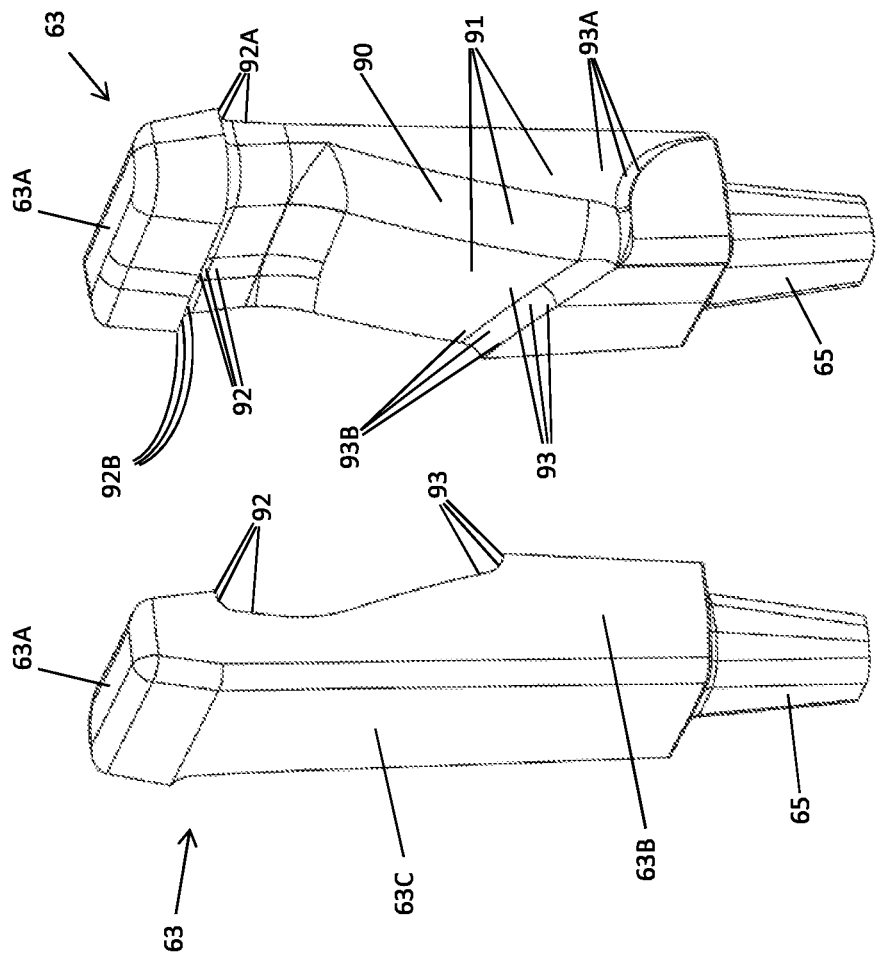

BRAKE CARRIER CASTING AND A METHOD OF MAKING A BRAKE CARRIER CASTING

TECHNICAL FIELD

The present invention relates to a brake carrier casting, and to a method of making a brake carrier casting.

BACKGROUND

Disc brake assemblies are known wherein a disc brake is mounted on a rotatable component of a vehicle, such as a wheel hub and a brake carrier are mounted on adjacent structure of the wheel, for example suspension structure. Slideably mounted on the brake carrier is a brake caliper. The brake caliper bridges the external periphery of the brake disc and includes brake pads having friction material. In order to brake the vehicle, the caliper clamps the brake disc between the brake pads thereby slowing the vehicle. The friction drag force created by the brake pads during braking is reacted via pad abutments of the brake carrier. As such the brake carrier must be able to support the brake drag force.

Some known brake carriers are cast from metal. A typical casting technique is to have a mold in the form of a lower mold half and an upper mold half. The lower mold half and upper mold half are fitted together thereby creating a casting void. Molten material is poured into the casting void and allowed to cool thereby providing the brake carrier casting.

In order to create the desired shape, casting cores may be inserted into the upper or lower mold halves prior to closing of the mold. Casting cores allow more complicated shapes to be provided in the casting.

Known brake carrier castings have a first side portion spaced from a second side portion thereby defining a plane of the brake rotor (or brake disc). The first and second side portions thereby also define an axis for rotation of the brake rotor. The first side portion is connected to the second side portion by a first bridge and also by a second bridge spaced from the first bridge. The first side portion, second side portion, first bridge and second bridge therefore define an opening of the brake carrier casting. In use a portion of the brake disc is positioned within the opening.

The casting technique creates a joint line on the finished casting. Thus, where the lower mold half meets the upper mold half a joint line is created in the finished casting. Furthermore, where a core meets either the lower mold half, or the upper mold half, or another core, then an appropriate joint line is produced in the finished casting. Joint lines may need a post casting operation such as machining or cropping to remove sharp edges and also prevent interference with other components. This cropping/machine process can itself cause stress raises. Joint lines also have the disadvantage that they can increase the likelihood of casting defects such as blow holes and inclusions. As a result, joint line can result in stress concentration thereby increasing the localized stresses in the casting when in use on the vehicle.

A known method of manufacturing a brake casting is to provide a "vertical" split line on the carrier. Thus, the lower mold half will include appropriate recesses defining one side portion, half of the first bridge and half of the second bridge. The upper mold half includes recesses defining the other side portion, the other half of the first bridge and the other half of the second bridge. The two mold halves are used in conjunction with a core. Such a casting method will produce a first joint line all the way around the first bridge and a second joint line all the way around the second bridge. However, such a method requires a large (and hence expensive) core.

Another known method is to provide a "horizontal" split line, i.e., the lower mold half includes recesses defining the radially inner portion of the carrier, i.e., a radially inner region of the first side portion, a radially inner region of the second side portion, a radially inner region of the first bridge and a radially inner region of the second bridge. The upper mold half includes a recess defining the radially outer part of the carrier, i.e., recesses defining a radially outer region of the first side portion, a radially outer region of the second side portion, a radially outer region of the first bridge and a radially outer region of the second bridge. Such a horizontally split arrangement creates a "horizontal" split line in the finished casting i.e., the split line that runs around an outside periphery of the carrier and also a split line that runs around the inside periphery of the carrier, i.e., a split line that runs around the above-mentioned opening. In particular, the split line that runs around the opening runs through regions of high stress, in particular the "inside corners" where the first side portion meets the first bridge, where the first side portion meets the second bridge, where the second side portion meets the first bridge, and where the second side portion meets the second bridge. Such casting methods do not require any cores.

SUMMARY

Thus, according to the present invention there is provided a method of making a brake carrier casting. The brake carrier casting may have a first side portion spaced from a second side portion thereby defining a plane of a brake rotor, and an axis of rotation of a brake rotor. The first side portion may be connected to the second side portion by a first bridge. The first side portion may be connected to the second side portion by a second bridge spaced from the first bridge. The first side portion, second side portion, first bridge, and second bridge may define an opening of the brake carrier casting. The method may include the steps of: a) providing a first mold half having a first recess defining at least a part of a radially inner region of the first side portion, at least a part of a radially inner region of the second side portion, at least a part of a radially inner region of the first bridge, and at least a part of a radially inner region of the second bridge; b) providing a second mold half having a second recess defining at least a part of a radially outer region of the first side portion, at least a part of a radially outer region of the second side portion, at least a part of a radially outer region of the first bridge, and at least a part of a radially outer region of the second bridge, the first mold half and second mold half defining a mold; c) providing a first core having a first core surface for defining the brake carrier casting; d) assembling the first core into one of the first or second mold halves in a position such that the first core surface defines a part of a surface of the first side portion facing the opening and defines a part of a surface of the first bridge facing the opening; and e) closing the mold by assembling the first mold half with the second mold half to provide a casting void, pouring molten material into the casting void and allowing the molten material to cool to provide the brake carrier casting.

Thus, according to a further aspect of the present invention there is provided a brake carrier casting having a first side portion spaced from a second side portion thereby defining a plane of a brake rotor, and an axis of rotation of a brake rotor, the first side portion being connected to the second side portion by a first bridge, the first side portion being connected to the second side portion by a second bridge space from the first bridge, the first side portion, second side portion, first bridge and second bridge defining an opening the brake carrier casting, the brake carrier casting having a casting joint line around an internal surface of the brake carrier casting the internal surface including a surface of the first side portion facing the opening, a surface of the second side portion facing the opening, a surface of the first bridge facing the opening, and a surface of the second bridge facing the opening, the casting joint line having a first joint line portion on the surface of the first side portion facing the opening, a second joint line portion on the surface of the first bridge facing the opening, a third joint line portion connecting an end of the first joint line portion to an end of the second joint line portion, and a fourth joint line portion connecting the end of the first joint line portion to the end of the second joint line portion.

BRIEF DESCRIPTION OF THE DRAWINGS

The invention will now be described, by way of example only, with reference to the accompanying drawings in which:

FIGS. 4A and 4B are views of a core used during the manufacture of the brake carrier of FIG. 1.

DETAILED DESCRIPTION

Figure 1A:
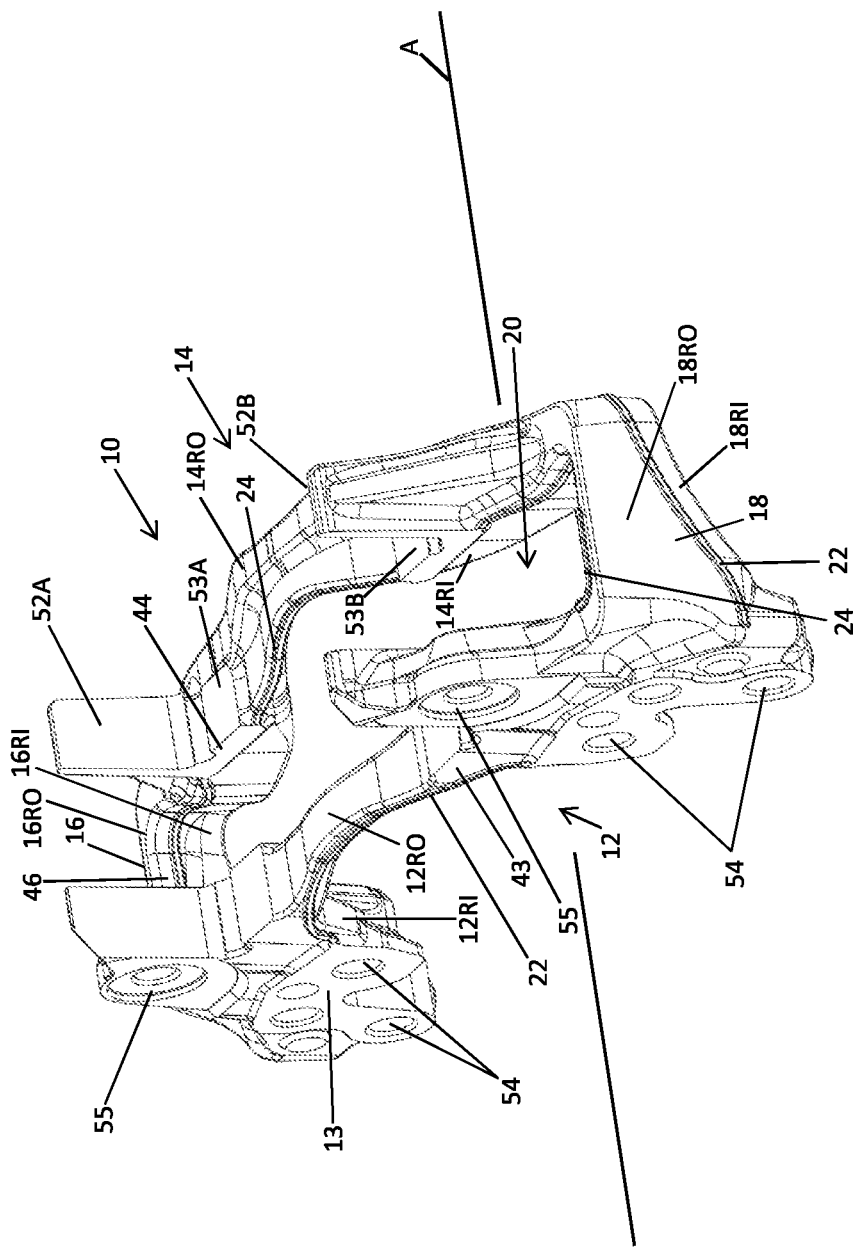
FIG. 1A is an isometric view of a casting according to the present invention.
Figure 1B:
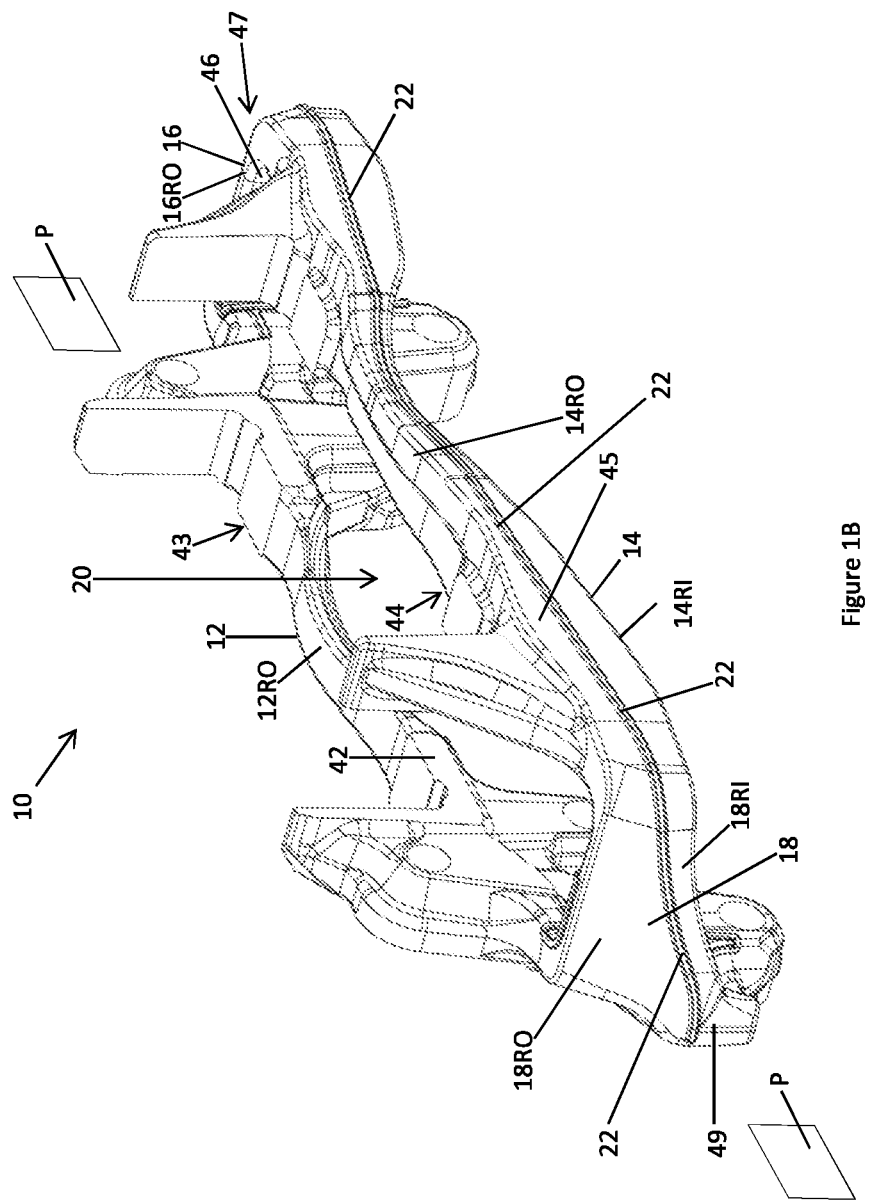
FIG. 1B is an alternative isometric view of the casting of FIG. 1A.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1A, 1B, 2, 3A and 3B there is shown a brake carrier casting 10 having a first side portion 12 (also known as an inboard portion) and a second side portion 14 (also known as an outboard portion). The first side portion is spaced from the second side portion thereby defining a plane P of a brake rotor, since, in use, a part of the brake rotor lies between the first side portion and second side portion. The first side portion and second side portion therefore also define an axis of rotation A of the brake rotor.

The first side portion is connected to the second side portion by a first bridge 16. The first side portion is also connected to the second side portion by a second bridge 18. The first and second bridges are spaced apart.

Consequently, the first side portion, second side portion, first bridge and second bridge define an opening 20 of the brake carrier casting 10. The opening includes plane P.

Thus, the brake carrier casting has radially inner regions with respect to axis A and radially outer regions with respect to axis A. The brake carrier casting has a radially inner region 12RI of the first side portion, a radially inner region 14RI of the second side portion, a radially inner region 16RI of the first bridge and a radially inner region 18RI of the second bridge. The brake carrier casting also has a radially outer region 12RO of the first side portion, a radially outer region 14RO of the second side portion, a radially outer region 16RO of the first bridge and a radially outer region 18RO of the second bridge.

Figure 2:
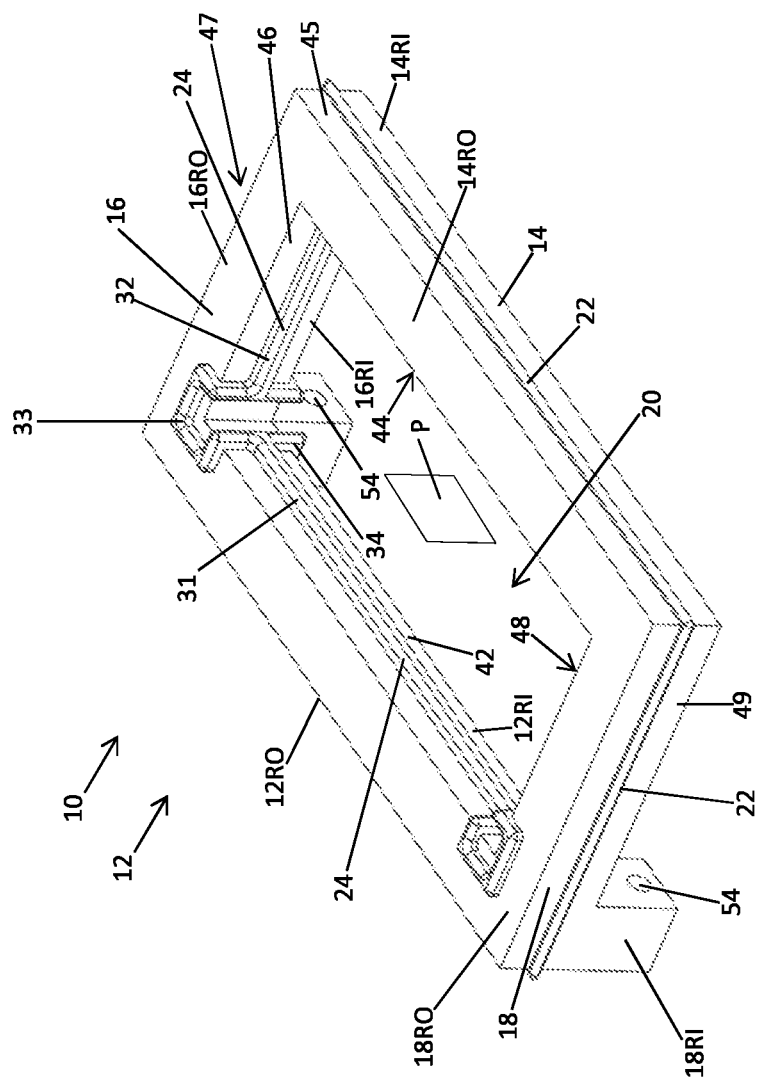
FIG. 2 is a rectilinear schematic representation of FIG. 1B.

Certain surfaces of the carrier face in certain directions with respect to the opening, thus surface 42 of the first side portion 12 faces opening 20, surface 44 of the second side portion 14 faces opening 20, surface 46 of the first bridge 16 faces the opening, and surface 48 of the second bridge 18 faces the opening (best seen on FIG. 2). Furthermore, surface 43 of the first side portion 12 faces away from the opening, surface 45 of the second side portion 14 faces away from the opening, surface 47 of the first bridge 16 faces away from the opening and surface 49 of the second bridge 18 faces away from the opening.

The first side portion 12 includes brake pad abutments 50A and 50B which restrain an inboard brake pad in a circumferential direction and brake pad abutments 51A and 51B which limit radially inward movement of the inboard brake pad. Similarly, the second side portion 14 has brake pad abutments 52A and 52B which restrain an outboard brake pad in a circumferential direction and brake pad abutments 53A and 53B which limit radial inward movement of the outboard brake pad. All of brake pad abutments 50A, 50B, 51A, 51B, 52A, 52B, 53A and 53B are machined surfaces of the casting.

The first side portion 12 also includes fixing holes 54 used to secure the carrier to a non-rotatable component of a vehicle adjacent the wheel, for example suspension structure. The first side portion 12 also includes bosses 55 which includes a machined hole used to attach pins (not shown) upon which an associated brake caliper can slide.

The casting process creates casting joint lines (as will be further described below) on the brake carrier casting. Thus, a first casting joint line 22 is created around an external periphery of the brake carrier casting. Thus, the first casting joint line 22 can be seen on surface 43 (see FIG. 1A), surface 49 (see FIG. 1A, FIG. 1B and FIG. 2), surface 45 (see FIG. 1B and FIG. 2) and on surface 47 (see FIG. 3A). In this example, the first casting joint line 22 is a continuous single line. Note that the brake carrier casting 10 has had various machining operations carried out on it and hence certain parts of the casting joint line have been machined away. Nevertheless, as a bare casting, in this example, the brake carrier casting 10 would have a single continuous joint line 22 travelling around the periphery of the casting.

The casting process also creates a second joint line on at least certain surfaces facing the opening. Thus, the second casting joint line 24 can be seen on surface 42 (see FIG. 2), surface 44 (see FIG. 1A), surface 46 (see FIGS. 1A and 2) and surface 48 (see FIG. 3). However, the second casting joint line 24 is not a single continuous joint line, rather it "splits" and "re-joins" in certain regions. Thus, the second casting joint line has a first joint line portion 31 (see FIGS. 2, 3A and 3B) on the surface of the first side portion facing the opening i.e., on surface 42. The second casting joint line 24 has a second joint line portion 32 on the surface of the first bridge facing the opening, i.e., on surface 46. The second casting joint line 24 has a third joint line portion 33 which connects end 31A of the first joint line portion 31 with end 32A of the second joint line portion. The second casting joint line 24 has a fourth joint line portion 34 which connects the end 31A of the first joint line portion with the end 32A of the second joint line portion.

Figures 3A, 3B:
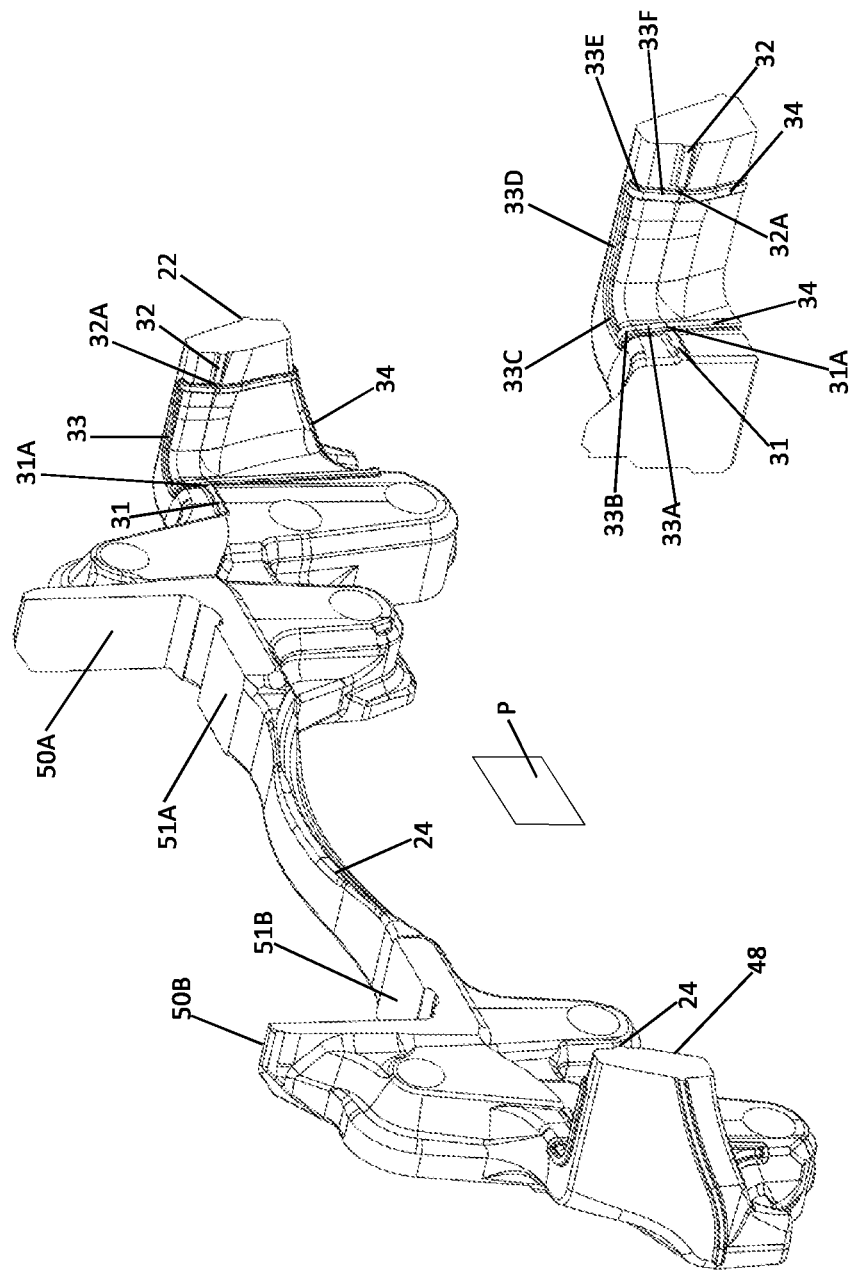
FIG. 3A is a cross section view of part of FIG. 1B.
FIG. 3B is an enlarged view of part of FIG. 3A.

Thus, as best seen in FIGS. 3A and 3B, the second casting joint line 24 does not extend into the inside corner formed by the first side portion and the first bridge, rather the second casting joint line 24 splits into the third joint line portion 33 which, from the first end 31A travels upwardly (at section 33A) when viewing FIG. 3B along the surface 42, around an upper edge of the opening (at section 33B), along the inboard portion (at section 33C), onto the first bridge (at section 33D), around an upper edge of the first bridge (at section 33E), down the surface 46 of the first bridge (at section 33F) to the end 32A of the second joint line portion 32. As such, the third joint line portion 33 avoids the inside corner formed between the first portion and the first bridge. Similarly, the fourth joint line portion 34 avoids the inside corner formed between the first side portion and the first bridge.

The inside corner formed between the first side portion and the first bridge is a region of relatively high stress, and by ensuring that no joint lines are produced in this relatively high stress region creates a brake carrier casting that is less prone to fatigue in this relatively high stress region and is therefore more durable. Furthermore, as will be appreciated because the area of localized stress is relatively small, then the core needed to protect this area and move the joint lines away from this area can consequently also be relatively small and therefore relatively cheap.

Figure 5:
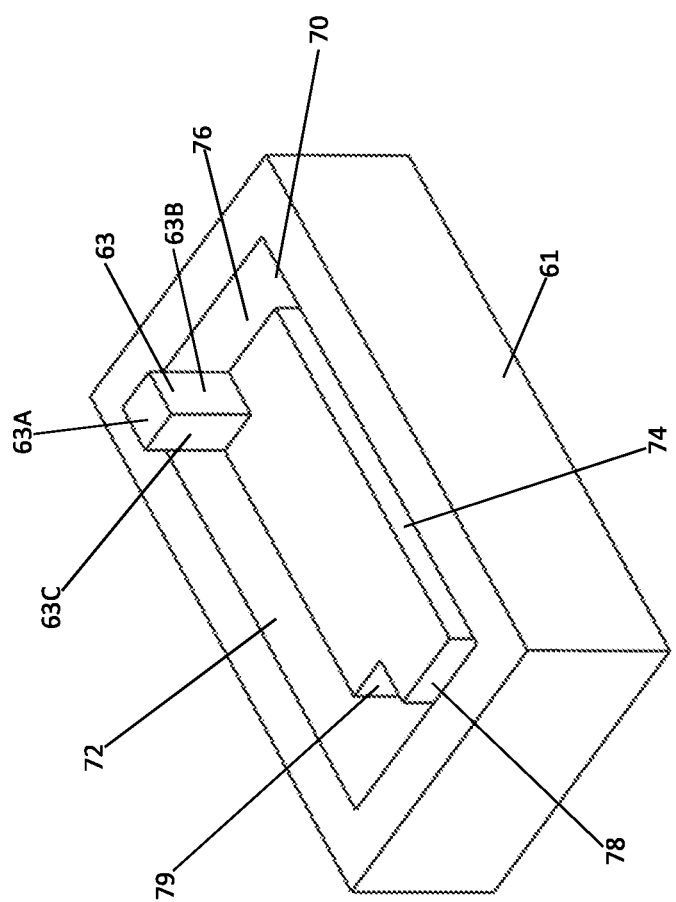
FIG. 5 is a rectilinear representation of a first mold half and first core used to manufacture the carrier of FIG. 1.
Figure 6:
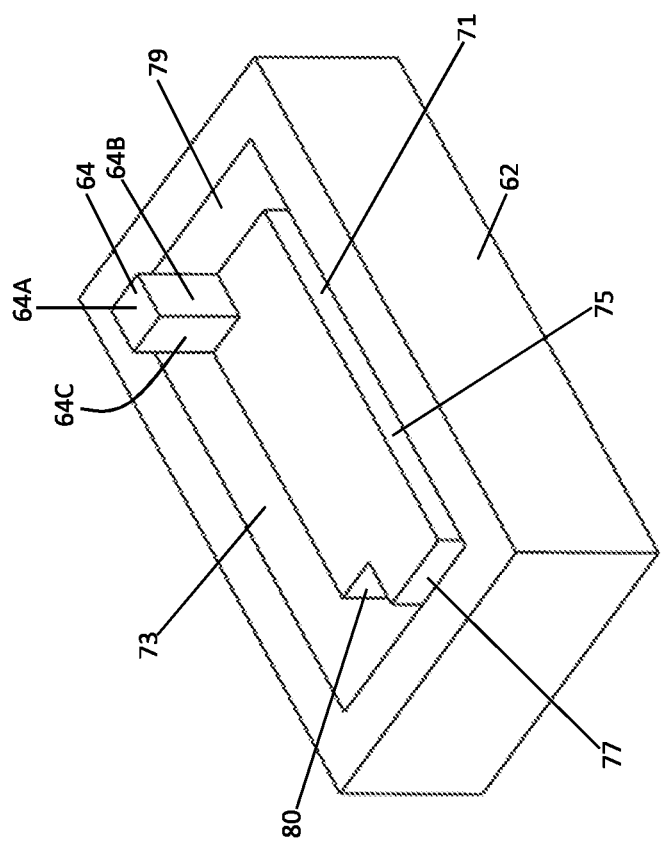
FIG. 6 is a rectilinear representation of a second mold half and second core used to manufacture the brake carrier of FIG. 1.

The method of casting such a brake carrier casting is as follows:

With reference to FIGS. 5 and 6 there is shown, in schematic rectilinear form a first mold half 61 and a second mold half 62. For the purpose of explanation, the first mold half is assumed to be a lower mold half and therefore mold half 62 is assumed to be an upper mold half. A first core 63 has been fitted to the first mold half and a second core 64 has been fitted to the second mold half.

The first mold half includes a recess 70 which will define, in the finished brake carrier casting certain regions of the brake carrier casting. Thus, recess region 72 will create radially inner region 12RI of the first side portion. Recess region 74 will produce the radially inner region 14RI of the second side portion. Recess region 76 will produce the radially inner region 16RI of the first bridge. Recess region 78 will produce the radially inner region 18RI of the second bridge.

The second mold half 62 also has a recess 71. Recess 71 has recess region 73 which will produce the radially outer region 12RO of the first side portion, recess region 75 which will produce the radially outer region 14RO of the second side portion, recess region 77 which will produce the radially outer region 16RO of the first bridge, and recess region 79 which will produce the radially outer region 18RO of the second bridge.

Certain regions of the recess 70 will not define a surface of the brake carrier casting, rather such regions are for receiving a mold core. Thus, recess region 79 of recess 70 will receive a part of core 64. Similarly recess region 80 of recess 74 will receive a part of core 63.

Certain parts of the core 63 and 64 will define surfaces on the brake carrier casting and other parts of the first and second cores will not define surfaces of the brake carrier casting, rather such other parts engage with regions of the first mold half or second mold half. Thus, core surfaces 64A, 64B, 64C of the second core 64 will engage in recess region 79 of recess 70 of the first mold half 61. Similarly, surfaces 63A, 63B and 63C (see especially FIG. 4B) will engage with recess regions 80 of recess 71 of the second mold half 62.

Turning to FIGS. 4A and 4B, the first core 63 is shown in more detail, in particular those surfaces of first core 63 which will define surfaces of the brake carrier casting can be seen, especially in FIG. 4A. Thus, the core surface 90 includes a convex region 91 which will form part of the surface of the first side portion facing the opening and also part of the surface of the first bridge facing the opening as a concave region of the brake carrier casting. In other words, convex region 91 forms the "inside corner" where the first side portion and first bridge meet. Because the convex region 91 is a smooth and continuous surface, then no casting joint lines will be formed in the brake carrier casting in this region.

The first core surface 90 also includes a concave region 92 which will define a convex edge of the opening of the brake carrier casting. Thus, concave region 92A will form the upper edge (when viewing FIG. 2) of the first side portion and concave region 92B will form the upper edge of the first bridge. Because concave regions 92A and 92B are smooth and continuous with convex region 91, then no joint line or similar will be created on the corresponding part of the brake carrier casting.

The first core surface 90 also includes a second concave region 93 which will form a convex lower "edge" of opening 20 of the brake carrier casting. The second concave region 93 has a concave region 93A which will form the lower edge of the side portion and a concave region 93B which will form the lower edge of the first bridge. Thus, the first core having a convex region 91 and an upper concave region 92 and lower concave region 93 creates the third joint line and fourth joint line which avoid the high stress corner between the first side portion and the first bridge.

Core 63 may include a tapered peg 65 which helps to secure the core in the first mold half 61.

Cores similar to core 63 can be included in the mold to create similar casting joint free regions in other corners of the brake carrier, such as the corner between the first side portion and the second bridge, and/or the corner between the second bridge and the second side portion and/or the corner between the second side portion and the first bridge. In the embodiments shown the surfaces of the second core 64 which produce a surface on the finished casting are a mirror image of the corresponding surfaces of the first core 63 ensuring the corners between the first side portion of the first bridge and the first side portion of the second bridge are free from casting joint lines. As shown in FIGS. 1 and 2, no such cores are used in the corners between the first bridge and the second side portion or between the second bridge and the second side portion. In the embodiments shown the stresses at these corners have been designed to be sufficiently low such that a casting joint line travelling through the corner is not detrimental. However, depending upon the particular design, and in particular depending upon the stresses found in the carrier in use, the carrier casting may include a single core to form the surface of any inside corner of the carrier, alternatively just two cores may be used to form the inside surfaces of two corners of the carrier, in particular an inside corner between the first side portion (i.e., the inboard portion) and the first bridge and an inside corner between the first side portion (i.e., the inboard portion) and the second bridge. Alternatively, three cores may be used. Alternatively, four cores may be used.

As shown in FIGS. 5 and 6, the first core is assembled into the first mold half and the second core is assembled in the second mold half prior to closing the first mold half and the second mold half. In further embodiments a particular core can be assembled into either the first mold half or the second mold half depending on the particular circumstances. Typically, cores may be assembled into the mold half which forms the lower mold half.

The casting technique may be any suitable type of casting technique, for example, sand casting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake carrier casting comprising:
   a first side portion;
   a second side portion that is spaced from the first side portion, thereby defining a plane of a brake rotor;
   a first bridge and a second bridge that connect the first side portion to the second side portion, wherein the first bridge is spaced from the second bridge and the first side portion, the second side portion, the first bridge, and the second bridge cooperate to define an opening:
   a casting joint line disposed around an internal surface of the brake carrier casting, the internal surface including:
      a surface of the first side portion facing the opening,
      a surface of the second side portion facing the opening,
      a surface of the first bridge facing the opening, and
   a surface of the second bridge facing the opening;
   wherein the casting joint line has a first joint line portion disposed on the surface of the first side portion facing the opening, a second joint line portion disposed on the surface of the first bridge facing the opening, a third joint line portion connecting an end of the first joint line portion to an end of the second joint line portion, and a fourth joint line portion connecting the end of the first joint line portion to the end of the second joint line portion.

2. The brake carrier casting of claim 1 wherein a section of the third joint line portion is spaced from the surface of the first side portion facing the opening and is spaced from the surface of the first bridge facing the opening.

3. The brake carrier casting of claim 2 wherein a section of the fourth joint line portion is spaced from the surface of the first side portion facing the opening and is spaced from the surface of the first bridge facing the opening.

4. The brake carrier casting of claim 1 wherein the first side portion is an inboard portion of the brake carrier casting and the second side portion is an outboard portion of the brake carrier casting.

5. The brake carrier casting of claim 4 when the first side portion defines at least one mounting feature for securing the brake carrier casting to a vehicle in use.

6. The brake carrier casting of claim 4 wherein the first side portion defines at least one caliper boss to allow a caliper to be movably secured to the brake carrier casting in use.

7. The brake carrier casting of claim 1 wherein the first joint line portion has a second end that is disposed opposite the end of the first joint line portion and the second end of the first joint line portion is spaced apart from the second, third, and fourth joint line portions.

8. The brake carrier casting of claim 7 wherein the second joint line portion has a second end that is disposed opposite the end of the second joint line portion and the second end of the second joint line portion is spaced apart from the first, third, and fourth joint line portions, and the first joint line portion does not extend to the second joint line portion.

9. The brake carrier casting of claim 1 wherein a section of the third joint line portion and a section of the fourth joint line portion are spaced from the surface of the first side portion facing the opening and are spaced from the surface of the first bridge facing the opening.

10. The brake carrier casting of claim 1 wherein the brake carrier casting has a further casting joint line around an external periphery of the brake carrier casting, the further casting joint line being a single continuous casting joint line, the external periphery including:
    a surface of the first side portion facing away from the opening,
    a surface of the second side portion facing away from the opening,
    a surface of the first bridge facing away from the opening, and
    a surface of the second bridge facing away from the opening.

11. The brake carrier casting of claim 1 wherein the first, second, third, and fourth joint line portions face toward the opening but do not extend into an inside corner that faces toward the opening and that is formed by the first side portion and the first bridge.

* * * * *